C. PETERSON.
TRAP DOOR GUARD.
APPLICATION FILED DEC. 10, 1919.
1,385,271.
Patented July 19, 1921.
3 SHEETS—SHEET 3.
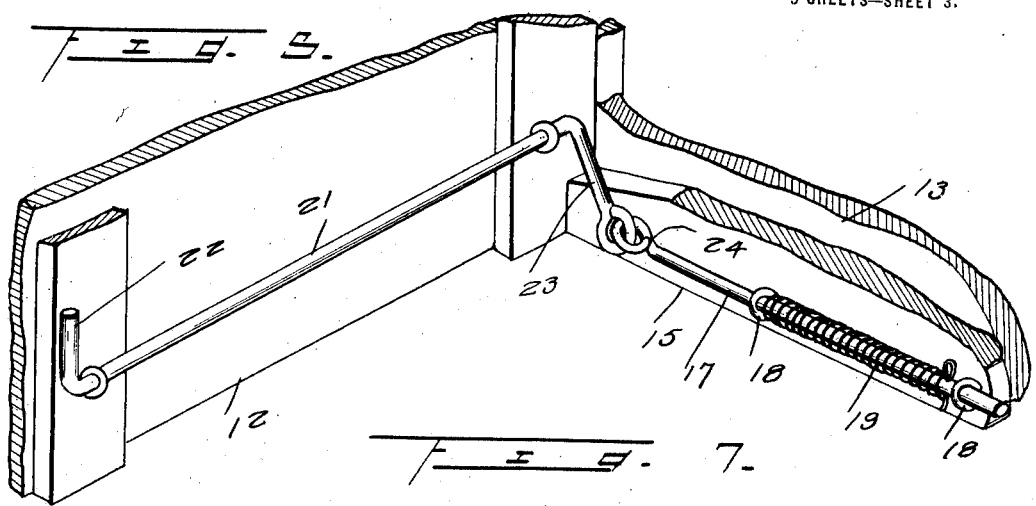
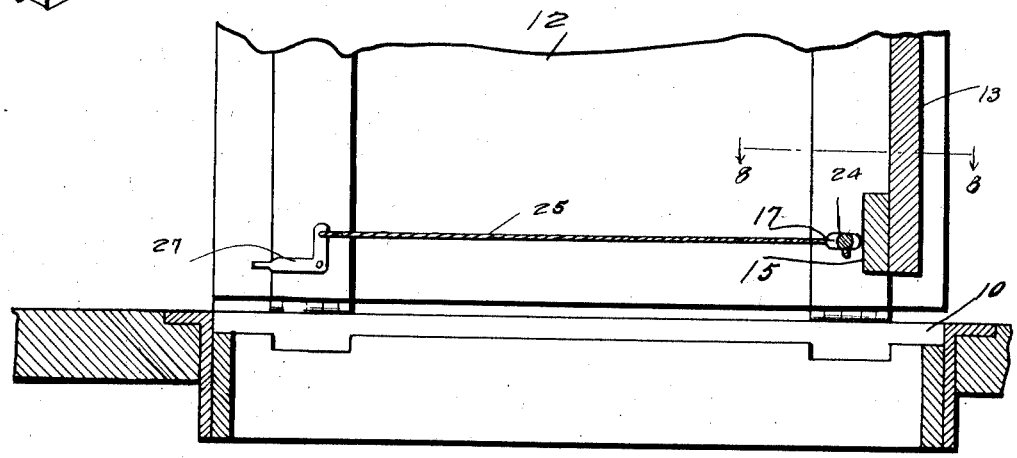
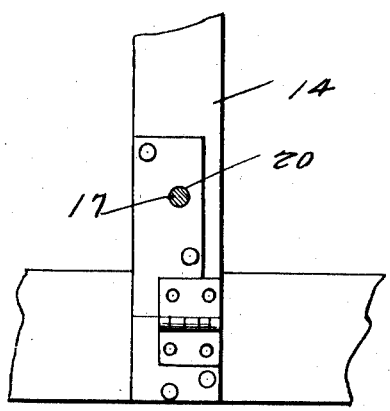
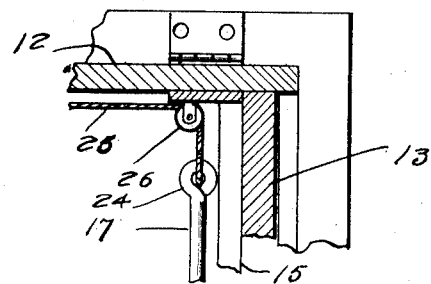
Inventor
C. Peterson.
By
Attorney

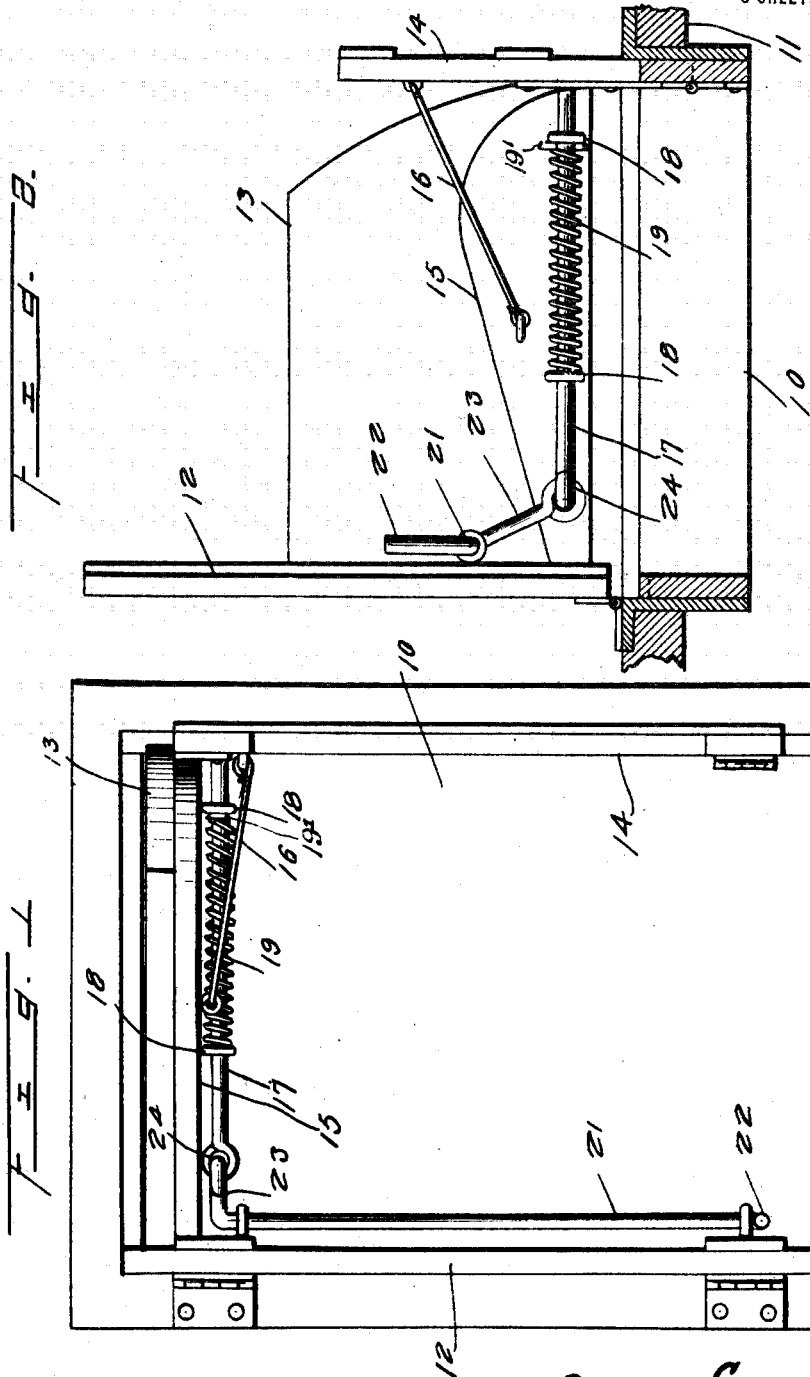

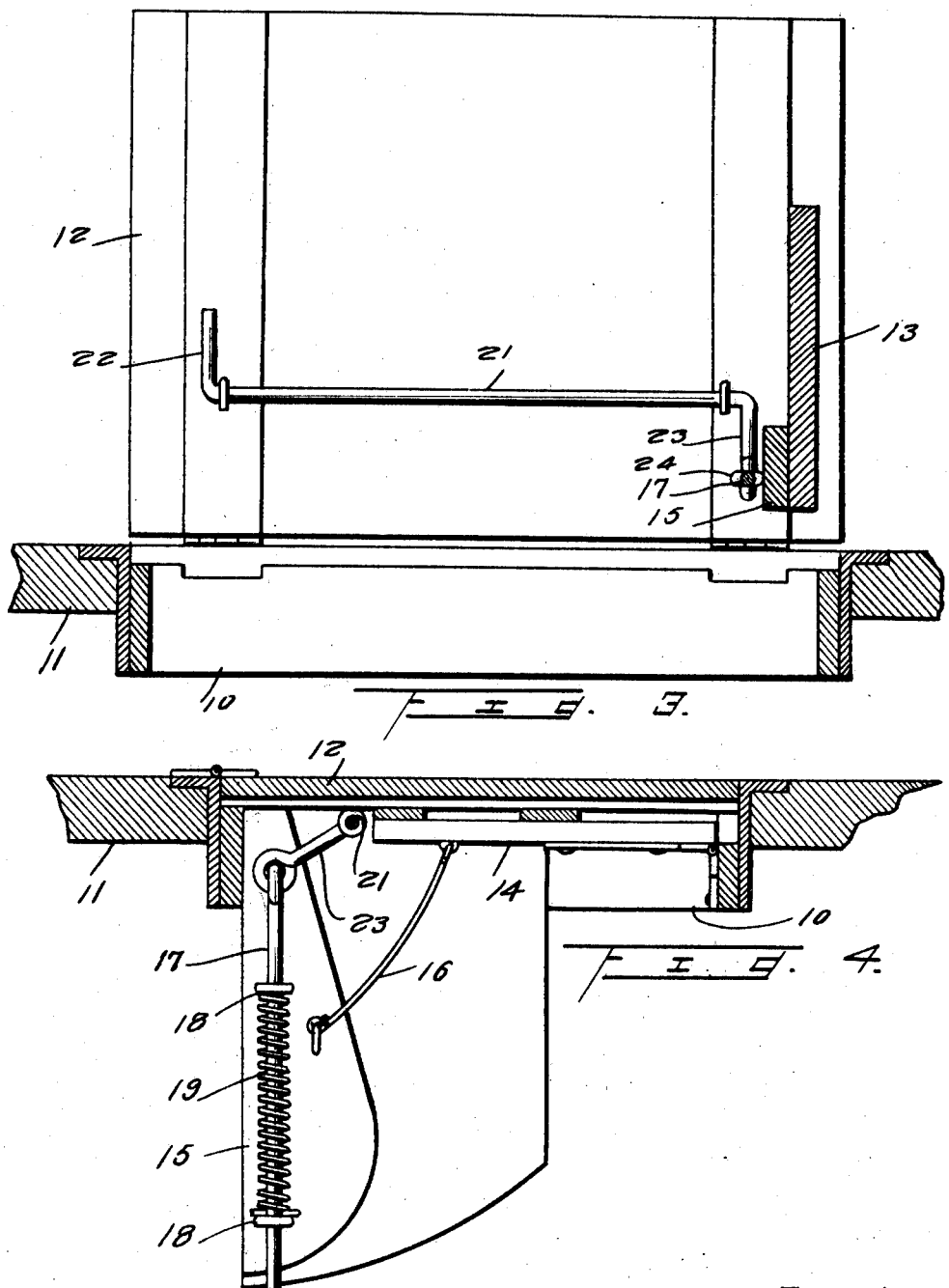

UNITED STATES PATENT OFFICE.

CHARLES PETERSON, OF LEAL, NORTH DAKOTA.

TRAP-DOOR GUARD.

1,385,271. Specification of Letters Patent. Patented July 19, 1921.

Application filed December 10, 1919. Serial No. 343,799.

*To all whom it may concern:*

Be it known that I, CHARLES PETERSON, a citizen of the United States, residing at Leal, in the county of Barnes and State of North Dakota, have invented certain new and useful Improvements in Trap-Door Guards; and I do hereby declare the following to be a full, clear, and exact description of the invention, such as will enable others skilled in the art to which it appertains to make and use the same.

This invention relates to an improved trap door guard and one object of the invention is to provide a guard which will be associated with a trap door closing a side walk opening or openings formed in a floor and communicating with a cellar, the guard being so constructed that it will be automatically raised to an operative position when the trap door is swung upwardly to an open position.

Another object of the invention is to so construct this guard that it will be securely held in a raised position when the trap door is open.

Another object of the invention is to so construct the guard that it may be readily released and permitted to swing to a lowered or inoperative position when the door is closed.

Another object of the invention is to provide a guard so constructed that it may be associated with a trap door already in place.

Another object of the invention is to so construct this guard that it is not liable to jam and prevent the opening of the trap door.

This invention is illustrated in the accompanying drawing, wherein:

Figure 1 is a top plan view showing a trap door in an open position and having the guards associated therewith.

Fig. 2 is an end elevation showing the door in an open position and the guards in a raised position.

Fig. 3 is a longitudinal sectional view looking toward the raised trap door, the trap door being shown in elevation.

Fig. 4 is a transverse sectional view through the trap door and guards in closed positions.

Fig. 5 is a detail view showing the latch and actuating element.

Fig. 6 is a fragmentary view showing the socket into which the latch fits.

Fig. 7 is a view similar to Fig. 3 showing a modified construction of latch actuating device, and Fig. 8 is a fragmentary section taken along the line 8—8 of Fig. 7.

In order to prevent danger of persons falling into opening 10 of the side walk or floor 11 when the trap door 12 is open there has been provided a guard 13 which is rigidly secured to the door 12 and a second guard 14 which is hingedly mounted at a point slightly below the level of the walk or floor and serves as a barrier or guard opposite to the open trap door and is actuated in its opening and closing movement by the guard 13. A cam strip 15 is positioned against and secured to the inner face of the guard 13 so that its curved edge is engaged by the guard 14 when the trap door is swung upwardly the hingedly mounted doors will also be swung upwardly and outwardly to the raised or operative position by reason of the operative pressure of the edge of said cam strip 15 bearing against the contacting edge of the guard 14. A latching plunger 17 which is operable by means of a rocker bar 21 to which it is connected, is slidably mounted in the eye 18 carried by and spaced apart on the cam strip 15. A spring 19 and a pin 19' are carried by the latching plunger between the eyes 18 and the pin 19' serves as a seat for one end of the spring 19 while the opposite end of the spring 19 bears against one of the eyes 18. The spring 19 serves to preferably hold the latching plunger 17 in an inoperative position with its operative end or free end extending past the end of the cam strip 15 to engage in the socket 20 located on the inner side of the guard 14 slightly above the hinged edge thereof, when the trap door is swung upwardly. The spring 19 may be readily pressed, however, when it is desired to withdraw the latching plunger from the socket 20 and permit closing of the trap door. In order to permit the guard to be easily swung to a closed position there has been provided a line 15 which is connected with the movable guard and rigid guard and will tend to draw the movable guard to a lowered position when the door is closed. Therefore when in a raised position the guard will be securely held in a raised position and also the trap door will be held in a raised position and the guard and trap door prevented from moving to a lowered position until the latch is released. It will thus be seen that when the trap door is in place the trap door will protect one side of the opening 10, the hinged guard the second side of the opening, and the rigid guard 13 will protect the exposed end of the opening. In side walk openings it is only necessary to protect one end of the opening as the other end is adjacent the curb or wall of a building but if this were used in connection with an opening formed in a floor and exposed from all sides a second guard 13 may be provided for the trap door. It will not of course be necessary to provide more than one latch.

The latch must be moved to an inoperative position when it is desired to close the trap door and in order to do so there has been provided a latch release which may be constructed either as shown in Figs. 3 and 5 or as shown in Fig. 7. In the form shown in Figs. 3 and 5 there has been provided a rocker bar or rod 21 having at one end a handle or lever extension 22 and at the opposite end an arm 23 which extends through the eye 24 of the latching plunger 17. It can be readily seen that when the rocker rod is rotated through the medium of the handle 22 the arm will be moved to draw the latching plunger against the action of the spring 19 and thus move the plunger out of the socket 20 so that the trap door may be swung downwardly and the movable guard swung inwardly to a position beneath the door. This guard 14 may have a tendency to fold inwardly to a closed position when the trap door is lowered or if it will not of itself drop to a closed position when the trap door is closed it will be drawn downwardly and swung inwardly to a closed position by the line 16.

In the form shown in Fig. 7 the rocker bar 21 is done away with and a chain or cable 25 will be passed through a pulley 26 and connected with the eye 24. The second end of this cable will be connected with the foot treadle 27 mounted upon the door where it can be conveniently operated with one foot when the door is to be swung to a closed position.

When in use the guard 13 will be rigidly connected with the trap door at one end and the guard 14 will be rigidly mounted at the opposite side of the opening 10 from the door. When in a closed position the guard 14 extends beneath the door and extends adjacent to or in engagement with the edge of the cam strip 15. When the trap door is swung upwardly the guard 13 being rigidly connected thereto the curved edge of the cam strip engages the opposing edge of the guard 14 and will cause said guards to be swung to a raised position simultaneously with the door and the other guards when the door is fully open. As the guard 13 and door swing upwardly and outwardly to an open position the latching plunger end being in contact with the inner side of the guard 14 will be compressed against the action of the spring until the plunger reaches the socket and the door fully opened. The plunger will then be moved into the socket by the spring and the door and guards will be securely but releasably held in an open or raised position. When it is desired to close the door the plunger will be moved to an inoperative position and the trap door can then be swung downwardly to a closed position, the guard swinging inwardly and downwardly beneath the door to the position shown in Fig. 4. It will thus be seen that there has been provided a trap door guard which is so constructed that it may be automatically moved to a raised or operative position when the trap door is open and which is further so constructed that they may be securely held in a raised position. There has further been provided a guard so constructed that it will move easily to an open or closed position and in which there is no danger of the guard jamming the trap door and preventing it from opening properly.

What is claimed is:

1. A combination with a structure having an opening formed therein, of a trap door hingedly mounted at one side of the opening, a guard mounted at the opposite side of the opening and adapted to fold beneath the trap door when the trap door is in closed position, a guard carried by said door adjacent one end of said opening, means for swinging the first mentioned guard upwardly to an upward position when the door is swung upwardly to an open position, and means for holding the second mentioned guard in engagement with the first mentioned guard when the door is in raised position.

2. The combination with a structure having an opening formed therein, of a trap door hingedly mounted at one side of the opening, a guard hingedly mounted at the opposite side of the opening and positioned beneath the trap door when the door is in a closed position, a rigid guard carried by said door and extending adjacent one end of the opening, a cam element carried by the rigid guard and engaging the hingedly mounted guard for swinging the guard upwardly to an operative position when the door is swung upwardly to an open position, and means for releasably holding the rigid guard in engagement with the hingedly mounted guard when the door and hingedly mounted guard are in a raised position.

3. The combination with a structure having an opening formed therein and a closure door hingedly mounted at one side of the opening, of a guard hingedly mounted at the opposite side of the opening, a rigid guard carried by said door and extending for engagement with the hingedly mounted guard, a latch carried by the rigid guard for engaging the hingedly mounted guard when the door and guard are in a raised position, and means for moving said latch to an inoperative position.

4. The combination with a structure having an opening formed therein and a closure door hingedly mounted adjacent one side of the opening, of a guard hingedly mounted adjacent the opposite side of the opening, a relatively rigid guard carried by the door and extending across one end of the opening in operative relation to the hingedly mounted guard when the door and guard are in a raised position, a latch pin slidably connected with the rigid guard and yieldably held in an extended position for engagement with the hingedly mounted guard, and means carried by the door and having connection with the latch pin for moving the latch pin to an inoperative position.

5. The combination with a structure having an opening formed therein and a closure door hingedly mounted at one side of the opening, of a guard hingedly mounted at the opposite side of the opening, a latch yieldably held in position for engagement with the guard when the guard and door are in raised position, guides carried by the door, and an operating element of flexible material passing about the guides and having engagement with the latch for moving the latch to an inoperative position.

In testimony whereof I affix my signature in presence of two witnesses.

CHARLES PETERSON.

Witnesses:
  EDWARD PETERSON,
  G. W. LYBECK.